United States Patent Office 3,138,692
Patented June 23, 1964

3,138,692
METHOD OF JOINING METAL PARTS
Martinus Antonius Maria Bakker, Johannes Christiaan Duran, and Bauke Visser, Emmasingel, Eindhoven, Netherlands, assignors to North American Philips Company, Inc., New York, N.Y., a corporation of Delaware
No Drawing. Filed June 1, 1962, Ser. No. 199,253
Claims priority, application Netherlands June 21, 1961
3 Claims. (Cl. 219—92)

The invention relates to a method of joining metal parts and to articles the component parts of which are joined by this method.

When parts at least one of which includes a bushing through which at least one metal wire passes in an electrically insulated manner, for example a glass bushing subject to compressive stress or a bushing the material of which has a coefficient of expansion substantially equal to that of the metal in which it is desposed and which is joined to the said metal, are joined to one another in a gas or vacuum-tight manner, the bushing is liable to be damaged.

Examples of articles of such structure are metal envelopes for transistors or thermionic valves. They comprise a base on which a transistor element or an electrode system is arranged and which includes glass bushings through which leads pass, and a metal hood or bulb which covers the element or the electrode system and the rim of which is joined to the base along the circumference thereof in a gas- or vacuum-tight manner.

Brazing has proved unsuitable for joining the said component parts. Owing to the high temperature involved the glass seal may melt and damage may be done to the electrode system by oxidation or to the semi-conductor crystal by diffusion. It has been found that a permanent vacuum-tight joint was not obtainable by soldering with the aid of alloys having a lower melting point. Welding also proved unsuitable since a glass seal cannot withstand abrupt temperature variations and an uneven supply of heat.

According to the invention the parts are coated with a layer substantially consisting of nickel by means of a known chemical nickel-plating bath comprising an aqueous solution containing nickel ions and hypophosphite ions in which the ratio expressed in mol percent between hypophosphite and nickel is at least 3 and which has a pH of from 4 to 7, preferably of from 4 to 5, the parts being maintained in contact with the bath until it contains substantially no more nickel ions in solution, after which the parts are locally joined to one another in a gas- or vacuum-tight maner by local application of heat. This local application of heat may take the form of resistance welding.

A method of joining parts is known wherein a phosphorus-containing nickel layer is deposited on the parts from a chemical nickel-plating bath, the parts are then brought into contact with one another and finally are heated to a temperature of from 800° C. to 1400° C. in a protective atmosphere until the layer is substantially free of phosphorus.

The experiments leading to the method in accordance with the invention have shown that in the above-described manner by combining the application of a nickel layer from a chemical nickel-plating bath used exhaustively and a resistance welding process the parts are joined very satisfactorily without damage to the glass bushings. It has been found that it is important for the heat supplied in the process of joining the parts not to be largely absorbed by the metal of the bases of the parts. In contradistinction to a nickel layer obtained in a different manner the nickel layer applied by the method described proved to have a particularly high electric resistivity and a low thermal conductivity compared with the metal of which the parts are usually made, for example iron or steel.

By the exhaustive chemical nickel-plating process a nickel layer is obtained having a content of phosphorus increasing from the inside towards the outside, for example of from 8% to 9% at the inside and of from 15% to 20% at the outside. This structure of the nickel layer in which the outer side has the lower melting point enables welding to be carried out at a low temperature (of about 800° C.), the surface layer melting and creeping into the welding joint by capillary action, whereas the nickel layer which adjoins the metal of the base and has a higher melting point does not flow and ensures satisfactory covering of the underlying metal.

Thus in welding it suffices to supply a comparatively small amount of energy for a short period of time.

It should also be mentioned that the layer of nickel of high phosphorus content deposited for the purpose described is remarkably resistant to hydrogen peroxide, and this is important in manufacturing transistor envelopes, for before the envelopes are sealed transistor elements have to be treated with hydrogen peroxide, and many metals cannot withstand this treatment.

The desired thickness of the nickel layer, for example of from 2 to 5 microns in accordance with the shapes of the parts to be welded, may be controlled by using the required amount of nickel salt in preparing the nickel-plating liquid. The temperature of the nickel-plating bath preferably is at most 85° C. since otherwise nickel is also deposited on the material of the bushing and has to be removed by a separate operation before the parts are welded. A minimum temperature of 65° C. is required for a sufficiently high rate of separation of the nickel and for the deposition of at least 90% of the nickel contained in solution.

When applying a nickel layer to a plurality of parts the nickel plating process is preferably performed in a rotating drum to produce a uniform coating.

To illustrate the increase in phosphorus content of a deposit of nickel obtained by exhaustive chemical nickel plating the following test was made.

The bath used contained 2 gms. of nickel in the form of nickelchloride per half litre and furthermore 0.22 mol/litre of sodium hypophosphite, 0.4 mol/litre of acetic acid and 0.3 mol/litre of sodium acetate. The pH value of the solution was 4.5. In this bath which was heated to a temperature of 85° C. a metal plate of known weight containing no phosphorus was immersed for a predetermined period of time ($t$) and subsequently dried and weighed. The deposited amount of nickel was ascertained in this manner. The phosphorus content of the deposit was then determined analytically.

A new plate was placed in the bath and subjected to an identical operation and analysis. This was repeated until the bath was exhausted by about 90°.

The following table indicates for such a series of plates the amounts (G) of nickel deposited from this bath during the periods given and the phosphorus contents of the said deposits.

Table

| t (minutes) | G (mgms.) | Percentage of phosphorus | Amount of pure Ni in deposit (mgms.) | Percentage of Ni deposited from the bath |
|---|---|---|---|---|
| 1 | 399 | 8.4 | 365 | 18 |
| 3 | 370 | 8.8 | 337 | 17 |
| 4 | 394 | 9.0 | 359 | 18 |
| 5 | 352 | 10.7 | 314 | 16 |
| 6 | 255 | 12.8 | 222 | 11 |
| 8 | 170 | 13.7 | 147 | 7.5 |
| 10 | 80 | 19.1 | 65 | 3 |
| Total amount of Ni in percent | | | | 90.5 |

What is claimed is:

1. A method of joining metal parts to each other comprising the steps of coating said metal parts with a phosphorus containing nickel layer by placing said metal parts in contact with a chemical nickel plating bath having a pH of from 4 to 7 and having hypophosphite and nickel ions in the mol ratio of at least 3 to 1, keeping said metal parts in contact with said bath until said bath is substantially free of nickel ions and then joining said metal parts to each other by resistance welding, said bath containing substantially not more nickel ions than will deposit on said metal parts.

2. A method of joining metal parts to each other comprising the steps of coating said metal parts in contact with a chemical nickel plating bath, heated to a temperature of from 65° to 85° C., having a pH of from 4 to 7 and having hypophosphite and nickel ions in the mol ratio of at least 3 to 1, keeping said metal parts in contact with said bath until said bath is substantially free of nickel ions and then joining said metal parts to each other by resistance welding, said bath containing substantially not more nickel ions than will deposit on said metal parts.

3. The method of claim 2 wherein the bath has a pH of between 4 and 5.

References Cited in the file of this patent

UNITED STATES PATENTS

| | | |
|---|---|---|
| 2,005,256 | Eitel et al. | June 18, 1935 |
| 2,200,742 | Hardy | May 14, 1940 |

UNITED STATES PATENT OFFICE
CERTIFICATE OF CORRECTION

Patent No. 3,138,692 June 23, 1964

Martinus Antonius Maria Bakker et al.

It is hereby certified that error appears in the above numbered patent requiring correction and that the said Letters Patent should read as corrected below.

Column 3, lines 2 to 14, in the table, under the heading "t (minutes)", first column, line 1 thereof, for "13" read -- 3 --.

Signed and sealed this 30th day of March 1965.

(SEAL)
Attest:

ERNEST W. SWIDER
Attesting Officer

EDWARD J. BRENNER
Commissioner of Patents